United States Patent
Borlick et al.

(10) Patent No.: US 9,800,481 B1
(45) Date of Patent: Oct. 24, 2017

(54) COMMUNICATING HEALTH STATUS WHEN A MANAGEMENT CONSOLE IS UNAVAILABLE FOR A SERVER IN A MIRROR STORAGE ENVIRONMENT

(71) Applicant: INTERNATIONAL BUSINESS MACHINES CORPORATION, Armonk, NY (US)

(72) Inventors: Matthew G. Borlick, Tucson, AZ (US); Lokesh M. Gupta, Tucson, AZ (US); Micah Robison, Tucson, AZ (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 15/298,223

(22) Filed: Oct. 20, 2016

(51) Int. Cl.
| | |
|---|---|
| G06F 11/00 | (2006.01) |
| H04L 12/26 | (2006.01) |
| H04L 29/08 | (2006.01) |
| G06F 11/20 | (2006.01) |
| H04L 29/14 | (2006.01) |
| H04L 12/703 | (2013.01) |

(52) U.S. Cl.
CPC ...... H04L 43/0823 (2013.01); G06F 11/2025 (2013.01); G06F 11/2046 (2013.01); H04L 43/06 (2013.01); H04L 45/28 (2013.01); H04L 67/1095 (2013.01); H04L 69/40 (2013.01)

(58) Field of Classification Search
CPC .. G06F 11/2025; G06F 11/2046; H04L 69/40; H04L 45/28
See application file for complete search history.

(56) References Cited

U.S. PATENT DOCUMENTS

| | | | |
|---|---|---|---|
| 6,654,801 B2 * | 11/2003 | Mann ................. | H04L 41/0213 709/217 |
| 7,234,073 B1 * | 6/2007 | Roytman ........... | G06F 11/2025 714/4.11 |
| 7,937,448 B2 | 5/2011 | Yamagami et al. | |

(Continued)

OTHER PUBLICATIONS

"A Method of Capturing a Forensically Secure System State Using a Freeze Switch", IP.com, IP.com No. IPCOMM000179026D, Feb. 4, 2009, pp. 3.

(Continued)

*Primary Examiner* — Chirag R Patel
(74) *Attorney, Agent, or Firm* — David W. Victor; Konrad Raynes Davda & Victor LLP (57) ABSTRACT

Provided are a computer program product, system, and method for communicating health status when a management console is unavailable for a server in a mirror storage environment. A determination at a first server is made that a management console is unavailable over the console network. The first server determines a health status at the first server and the first storage in response to determining that the management console cannot be reached over the console network. The health status indicates whether there are errors or no errors at the first server and the first storage. The first server transmits the determined health status to the second server over a mirroring network mirroring data between the first storage and a second storage managed by the second server. The determined health status is forwarded to an administrator.

21 Claims, 5 Drawing Sheets

FIG. 2

(56) References Cited

U.S. PATENT DOCUMENTS

| | | |
|---|---|---|
| 7,996,707 B2 | 8/2011 | Coronado et al. |
| 8,230,077 B2 | 7/2012 | Anderson et al. |
| 8,806,265 B2 | 8/2014 | Han et al. |
| 9,298,567 B2 | 3/2016 | Blea et al. |
| 9,396,121 B2 | 7/2016 | Gupta et al. |
| 2005/0125557 A1* | 6/2005 | Vasudevan .......... G06F 11/2041 709/239 |
| 2006/0048017 A1* | 3/2006 | Anerousis ........... G06F 11/1438 714/47.2 |
| 2009/0254716 A1 | 10/2009 | Acedo et al. |
| 2016/0048452 A1 | 2/2016 | Gill et al. |
| 2016/0132685 A1 | 5/2016 | Lovrien et al. |

OTHER PUBLICATIONS

M. Wambeke, "An Introduction to the DS8880", Mainframe Watch Belgium, Dec. 2, 2015, pp. 7, [online] http://mainframe-watch-belgium.blogspot.com/2015/12/an-introduction-to . . . .

Westphal, et al., "IBM System Storage DS8000 Architecture and Implementation", IBM Corporation, Document No. SG24-8886-02, Nov. 2012, pp. 534.

\* cited by examiner

FIG. 1

Health Status Message

COMMUNICATING HEALTH STATUS WHEN A MANAGEMENT CONSOLE IS UNAVAILABLE FOR A SERVER IN A MIRROR STORAGE ENVIRONMENT

BACKGROUND OF THE INVENTION

1. Field of the Invention

The present invention relates to a computer program product, system, and method for communicating health status when a management console is unavailable for a server in a mirror storage environment.

2. Description of the Related Art

In a storage environment, primary and secondary storage servers may maintain mirror copy relationships, where a primary volume in a mirror copy relationship comprises the storage or volumes from which data is physically copied to a secondary volume. A server and storage involved in the mirror copy relationships may be implemented in a storage system, such as the International Business Machine Corporation's ("IBM") DS8000®, which also includes a hardware management console (HMC) that is a dedicated workstation physically located inside the DS8000 storage system. The HMC may proactively monitor the state of the storage system and notify an administrator or a remote monitoring service when service and repairs are required. The storage system may further include multiple server components, or storage facility Central Electronic Complexes (CECs), and disk enclosures for disk drives implementing the storage. When the storage systems, such as the DS8000s, are deployed in a mirror storage environment, the data may be mirrored among the storages implemented in the storage system, which connect over a network.

In certain implementations, the HMC may connect to the CECs or processing complexes over a dedicated network, which is separate from the network used to mirror data between the storage systems.

There is a need in the art for improved techniques for monitoring and reporting the health status in a mirror copying relationship.

SUMMARY

Provided are a computer program product, system, and method for communicating health status when a management console is unavailable for a server in a mirror storage environment. A determination at a first server is made that a management console is unavailable over the console network. The first server determines a health status at the first server and the first storage in response to determining that the management console cannot be reached over the console network. The health status indicates whether there are errors or no errors at the first server and the first storage. The first server transmits the determined health status to the second server over a mirroring network mirroring data between the first storage and a second storage managed by the second server. The determined health status is forwarded to an administrator.

DETAILED DESCRIPTION

A management console in a storage system, such as a Hardware Management Console (HMC), may become unavailable because of a failure of the management console or the network connecting the management console to a storage system processing facility. In such case, the management console may not be able to detect errors in the storage system, such as failures of a storage device or other component, which are non-disruptive errors that do not prevent the storage system from participating in the mirror storage environment. However, such non-disruptive errors, if not addressed, may result in greater problems if another component fails, which in combination with the previous non-disruptive failure, results in a catastrophic failure of the storage system. For instance, failure of one hard disk drive in a Redundant Array of Independent Disks (RAID) may not result in data failure because the RAID controller may be able to reconstruct data using the parity information. However, if the failed hard disk drive is not replaced, then failure of another hard disk drive may result in multiple disk drives failing, which the RAID controller may not be able to error correct. In such case, the failure of the management console to detect errors or failures not causing the storage system to fail may eventually result in a catastrophic failure.

Described embodiments address the above problems by monitoring whether the management console is available over a console network separate from the network over which data is mirrored. If the management console is unavailable, then a health status at a server and/or a storage managed by the server is determined. The server transmits the determined health status to a remote server involved in mirroring data over a mirroring network used to mirror data among servers. The server receiving the health status may then forward the health status to an administrator, such as by forwarding the received health status to a management console coupled to the receiving server over a separate management console network connected to the receiving server.

With the described embodiment, detected errors and component failures may be reported over a mirroring network when they cannot be communicated over a management console network over which they are normally monitored. This allows errors to be detected, reported and addressed to avoid further failures, including possible catastrophic failure.

Figure 1:
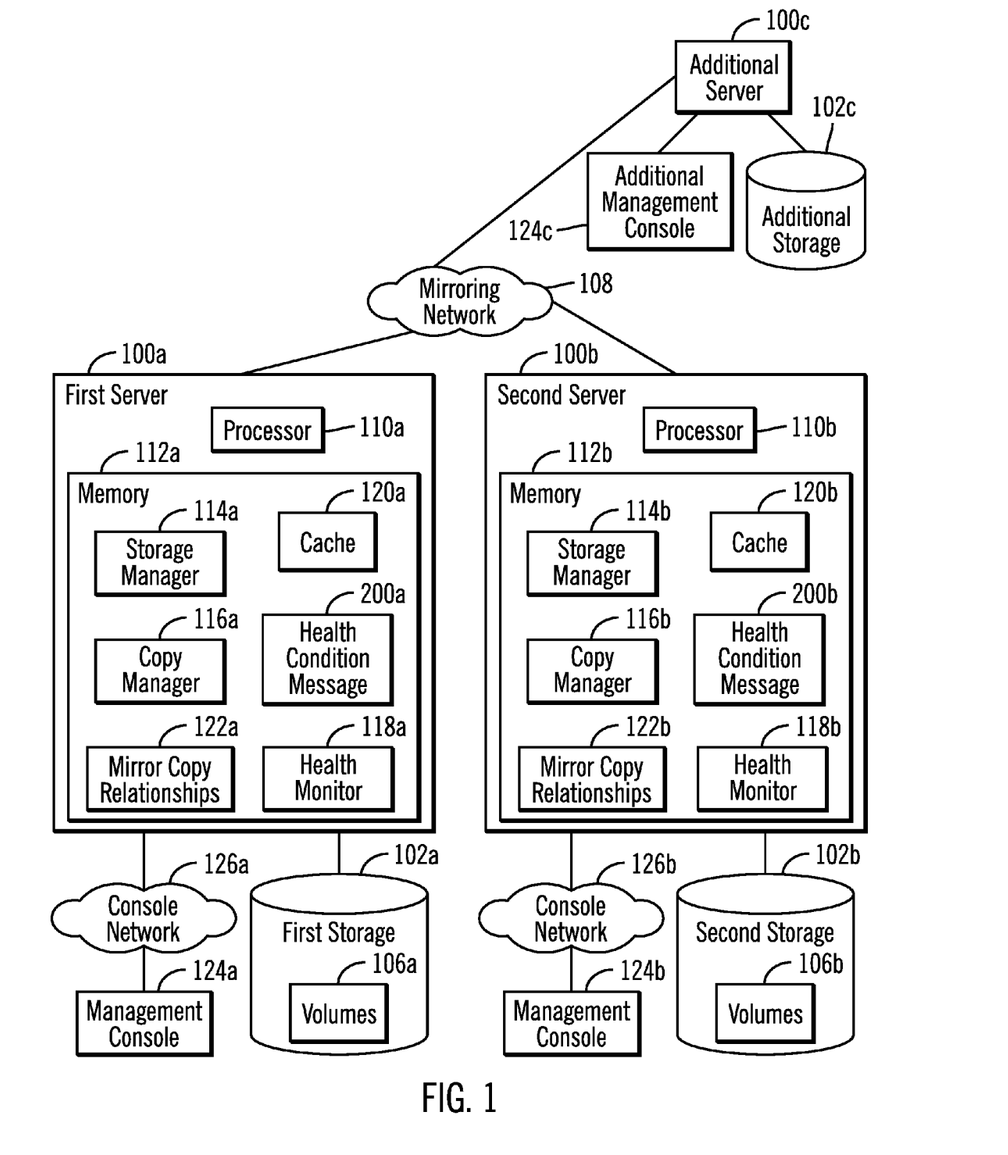
FIG. 1 illustrates an embodiment of a mirror storage environment.

FIG. 1 illustrates a mirroring storage environment having a first server 100*a*, second server 100*b*, and at least one additional server 100*c* that manage a first storage 102*a*, a second storage 102*b*, and at least one additional storage 102*c*, respectively. A host (not shown) may access volumes 106*a*, 106*ab*, and additional volumes (not shown) configured in the first storage 102*a*, the second storage 102*b*, and the at least one additional storage 102*c*. The primary server 100*a*, the secondary server 100*b*, and the at least one additional server 100*c* may mirror data in their respective storage 102*a*, 102*b*, 102*c* over a mirroring network 108.

Each server 100a, 100b includes a processor 110a, 110b, comprising one or more processor devices, and a memory 112a, 112b. Each memory 112a, 112b includes a storage manager 114a, 114b to manage read and write access to the respective storage 102a, 102b from a host; a copy manager 116a, 116b to mirror data between the servers 100a, 100b; a health monitor 118a, 118b to monitor the health of components in the servers 100a, 100b, including the management console 124a, 124b, and generate a health status message 200a, 200b indicating a health condition detected by the health monitor 118a, 118b with respect to the server 100a, 100b, storage 102a, 102b, and management console 124a, 124b, respectively; a cache 120a, 120b to cache read and write data with respect to the volumes 106a, 106b in the respective primary 102a and secondary 102b storages. The copy managers 116a, 116b may generate mirror copy relationship information 122a, 122b having information on mirror copy relationships of volumes 106a, 106b in the first storage 102a and second storage 102b subject to mirror copying of data there between, respectively.

Volumes 106a, 106b configured in the storages 102a, 102b, respectively, may comprise a Logical Unit Number (LUN), Logical Subsystem (LSS), or any grouping of tracks, where a track may comprise a block, track or any data unit.

The first server 100a and second server 100b each are coupled to a management console 124a, 124b over separate console networks 126a, 126b, respectively. The management consoles 124a, 124b comprise separate computer systems with which the servers 100a and 100b communicate. The servers 100a, 100b may provide status information to an administrator operating the management consoles 124a, 124b, and the administrator may configure the servers 100a, 100b through the respective management console 124a, 124b, such as configure volumes 106a, 106b and mirror copy relationships 122a, 122b.

The management console networks 126a, 126b may be implemented in hardware separate from the mirroring network 108. For instance, the servers 100a, 100b may include separate adaptor ports to communicate with hardware and switches implementing the console network 126a, 126b and the hardware and switches implementing the mirroring network 108. Using different ports, virtual or physical, in the servers 100a, 100b to connect to the different mirroring 108 and console 126a, 26b networks maintains the networks separate from each other.

In certain embodiments, the mirroring network 108 may only be used to copy data being mirrored as indicated in mirror copy relationships 122a, 122b while the respective management consoles 124a, 124b are available over the console networks 126a, 126b. Further, the console networks 126a, 126b may only be used for communications between the servers 100a and 100b and their respective management consoles 124a, 124b.

In certain embodiments, data in volumes 106a in the first storage 102a may be mirrored to volumes 106b in the second storage 102b according to configured mirror copy relationships 122a, 122b. Further, the data mirrored from the first storage 102a to the second storage 102b may further be mirrored to at least one additional storage 102c either from the first server 100a or the second server 100b upon receiving data mirrored from the first server 100a. Further, additional servers 100c may mirror data from one to the other, and the second server 100b may mirror data from the second storage 102b to other of the servers 100a, 100c. The additional servers 100c, additional storage 102c and additional management consoles 124a for the additional servers 100c may have the same arrangement and components as described with respect to the servers 100a, 100b, storages 102a, 102b, and management consoles 124a, 124b. Data may also be mirrored from the second storage 102b and additional storages 102c to any other storage 102a, 102b, 102c.

In one embodiment, the first server 100a, first storage 102a, and first management console 124a and the second server 100b, second storage 102b, and second management console 124b may be implemented as components in first and second storage system enclosures, respectively, such as the International Business Machines Corporation (IBM®) DS8000® and DS8880 storage systems. Further, in each storage system, there may be multiple servers, implemented as redundant storage facility Central Electronic Complexes (CECs), with redundant storage and redundant connections to the mirroring network 108 and console networks 126a, 126b. (IBM and DS8000 are trademarks of International Business Machines Corporation throughout the world).

The mirroring 108 and console networks 126a, 126b may comprise a Storage Area Network (SAN), Wide Area Network (WAN), Local Area Network (LAN), the Internet, and Intranet, a wireless network, wired network, etc. Additionally, the networks 108, 126a, 126b may be implemented using other types of bus or network interfaces, including a Peripheral Component Interconnect Express (PCIe) bus.

The storages 102a, 102b, 102c may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. The volumes 106a, 106b may further be configured from an array of devices, such as Just a Bunch of Disks (JBOD), Direct Access Storage Device (DASD), Redundant Array of Independent Disks (RAID) array, virtualization device, etc. Further, the storages 102a, 102b may comprise heterogeneous storage devices from different vendors and different types of storage devices, such as a first type of storage devices, e.g., hard disk drives, that have a slower data transfer rate than a second type of storage devices, e.g., SSDs.

The components, such as the storage manager 114a, 114b, copy manager 116a, 116b, and health monitor 118a, 118b may be implemented in computer readable program instructions in a computer readable storage medium executed by a processor and/or computer hardware, such as an Application Specific Integrated Circuit (ASIC).

Figure 2:
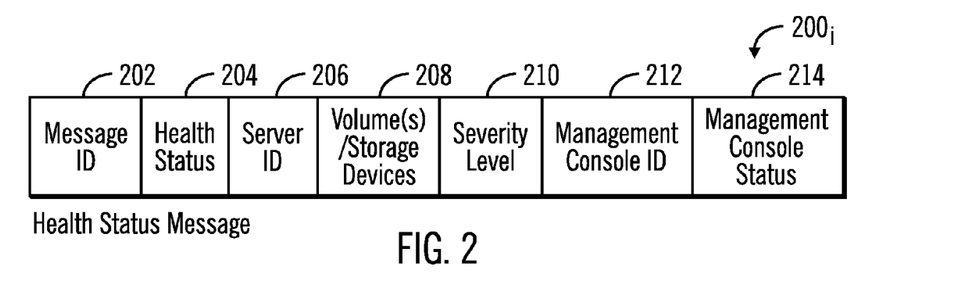
FIG. 2 illustrates an embodiment of a health status message.

FIG. 2 illustrates an embodiment of a health status message 200—such as health status messages 200a, 200b, generated by the health monitor 118a, 118b upon detecting a health condition or error affecting access to the volumes 106a, 106b, and includes: a message identifier (ID) 202; a health status 204 indicating there is no problem or indicating the type of error or health condition with respect to the server 206 components and storage; a server ID 206 indicating the server 100a, 100b for which the health status 204 is generated; one or more volumes and/or storage devices 208 impacted by the health condition; a severity level 210 of the health condition, e.g., minor, acute, severe, etc.; a management console ID 212 of a management console 124a, 126b at the server 206; and a management console status 214 indicating whether the management console 214 is operational or unavailable.

The health status 204 may indicate a hardware error in the server 206 or storage 102a, 102b managed by the server 206 that may be resolved by fixing or replacing the hardware or storage devices, such as errors in a device or host adaptor in the server 206, and other software and/or hardware errors, etc. The management console status 214 may indicate hardware or software errors in the identified management console 212 or the console network 126a, 126b over which the management console 212 connects to the server 206.

An administrator being notified of the health status message $200_i$, which may surface at a management console 124a, 124b, may then take appropriate action to replace hardware or fix errors at the server 206, the storage 102a, 102b and/or the management console 212 based on the health status 204 and management console status 214. The health status 204 may indicate that there is no problem with the health of the server 206 and the managed volumes 208, but the management console status 214 may indicate an error or problem with the management console 212, such as that it is unavailable. Still further, the health status 204 may indicate an error with the server 206 and managed volumes 208 and the management console status 214 may indicate unavailability of the management console 212, indicating both need to be fixed or repaired.

Figure 3:
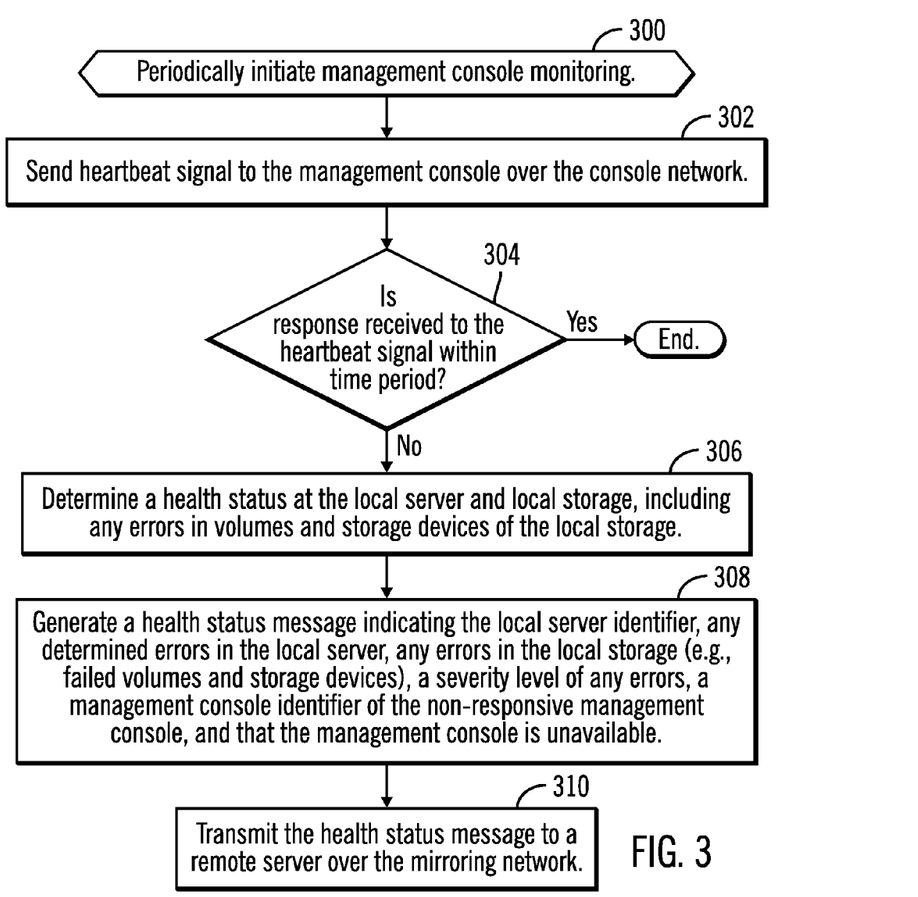
FIG. 3 illustrates an embodiment of operations to monitor a management console of a storage system.

FIG. 3 illustrates an embodiment of operations performed by the health monitor 118a, 118b or other component in the server 100a, 100b to generate a health status message 200a, 200b. The local server 100a, 100b in which the health monitor 118a, 188b is operating may comprise a primary server mirroring data to the secondary server, or may be the secondary server receiving data to store at the secondary site. Upon the health monitor 118a, 118b periodically (at block 300) initiating monitoring of the management console 124a, 124b, a heartbeat signal is sent (at block 302) to the connected management console 124a, 124b over the console network 126a, 126b. If (at block 304) a response to the heartbeat signal is not received within a predetermined time period, then the health monitor 118a, 118b determines (at block 306) a health status at the local server 100a, 100b and local storage 102a, 102b, including any software or hardware errors in the volumes 106a, 106b or storage devices of the local storage 102a, 102b, where an error may comprise a partial or total failure of a component or program operations. The health monitor 118a, 118b generates (at block 308) a health status message 200a, 200b indicating the local server identifier 206, any determined errors in the local server in health status field 204, any errors in the local storage (e.g., failed volumes and storage devices) in field 208, a severity level 210 of any errors, a management console identifier 212 of the non-responsive management console 124a, 124b, and that the management 212 console is unavailable in the management console status field 214. The health status message 200a, 200b is transmitted (at block 310) over the mirroring network 100 to a connected remote server 100b, 100a to surface the health status to an administrator.

If (at block 304) the heartbeat signal is received, then control ends because any errors or problems with any components at the local server 100a, 100b or local storage 102a, 102b would surface at the connected management console 124a, 124b.

With the described embodiment of operations of FIG. 3, the mirroring network 108, which is otherwise exclusively used for data mirroring operations, is used to transmit health status information when one of the servers 100a, 100b cannot communicate with the connected management console 124a, 124b. This allows any problems or errors to surface at another console or device operated by the administrator so that the administrator is made aware of the problems and can fix or replace any failed parts to avoid future problems which could be catastrophic. For instance, a failure of a storage device in the storage 102a, 102b may not currently effect operations at the storage 102a, 102b if error recovery methods, such as Redundant Array of Independent Disk (RAID) and error correction codes (ECC), are able to recover data on the failed storage device. However, it is important to alert the administrator of such errors immediately to replace or fix the failed storage device because failure of an additional storage device at the storage 102a, 102b may prevent data from being recovered.

In certain embodiments, to transmit the health status message 200a, 200b when there are additional servers 100c and storages 102c in the mirror storage environment, the health monitor 118a, 118b may broadcast the generated health status message 200a, 200b to all remote servers 100b, 100a, 100c in the environment as a broadcast message.

Figure 4:
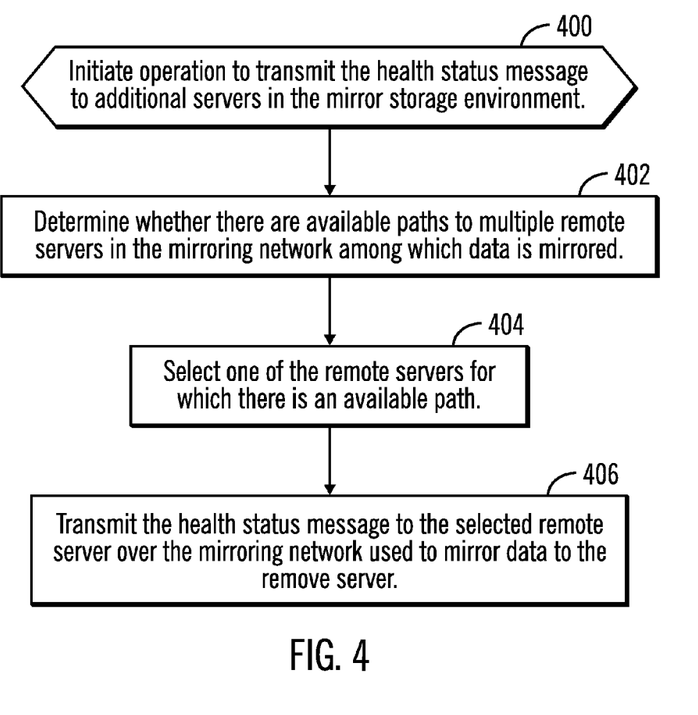
FIG. 4 illustrates an embodiment of operations to transmit a health status message to a remote server in a mirror storage environment.

FIG. 4 illustrates an embodiment of operations performed by the health monitor 118a, 118b to transmit the health status message 200a, 200b when there are multiple remote servers 100a, 100b and 100c in the storage environment to which the local server 100a, 100b may transmit health status. Upon initiating (at block 400) an operation to transmit the health status message 200a, 200b to additional servers 100b, 100b, 100c in the mirror storage environment, the health monitor 118a, 118b determines (at block 402) whether there are available paths to multiple remote servers 100b, 100a and 100c in the mirroring network 108 among which data is mirrored. The health monitor 118a, 118b selects (at block 404) one of the remote servers 100b, 100a, 100c for which there is an available path in the mirroring network 108. The health monitor 118a, 118b then transmits (at block 406) the health status message 200a, 200b to the selected remote server over the mirroring network 108 used to mirror data to the remove server.

Figure 5:
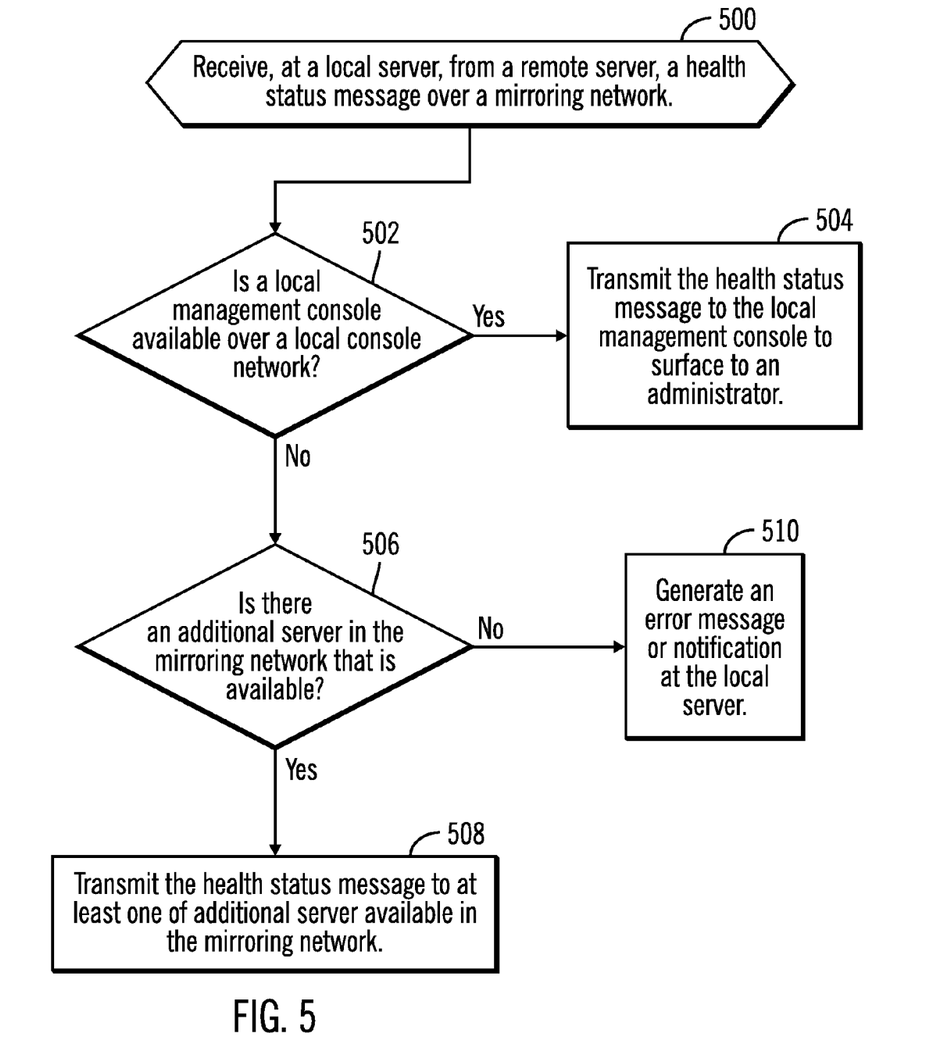
FIG. 5 illustrates an embodiment of operations for a server to process a health status message received from a remote server in the mirror storage environment.

FIG. 5 illustrates an embodiment of operations performed by a health monitor 118a, 118b or other component at a server receiving a health status message 200a, 200b. Upon a server 100a, 100b, 100c referred to as the local server, receiving (at block 500) a health status message $200_i$ from a remote server, i.e., the server 100a, 100b, 100c sending the health status message $200_i$ over the mirroring network 108, the health monitor 118a, 118b determines (at block 502) whether the local management console 124a, 124b is available over the local console network 126a, 126b. If so, then the health monitor 118a, 118b transmits (at block 504) the health status message $200_i$ to the local management console 124a, 124b to surface to an administrator to take action to fix or repair any problems with the server 100a, 100b, 100c, or connected storage 102a, 102b, 102c resulting in the health status message $200_i$, and the unavailable management console 212.

If (at block 502) the local management console 124a, 124b is not available, then a determination is made (at block 506) whether an additional server 100c in the mirroring network 108 is available. If so, then the health monitor 118a, 118b transmits (at block 508) the health status message $200_i$ to the at least one additional server 100c available in the mirroring network 108. Otherwise, if an additional server 100c is not available to surface the error message, including unavailability of a management console 124a, 124b, 124c, then an internal error message or notification at the local server is generated, to provide at an output device at the local server or to output to another location.

In described embodiments, the health status message $200_i$ is sent to another server 100a, 100b, 100c in the mirror network 108 to surface at a management console at another server. Alternatively, the health status message may be transmitted through a third channel, such as a separate network, independent of the mirroring 108 and console networks 126a, 126b, to a remote system to provide to the administrator.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
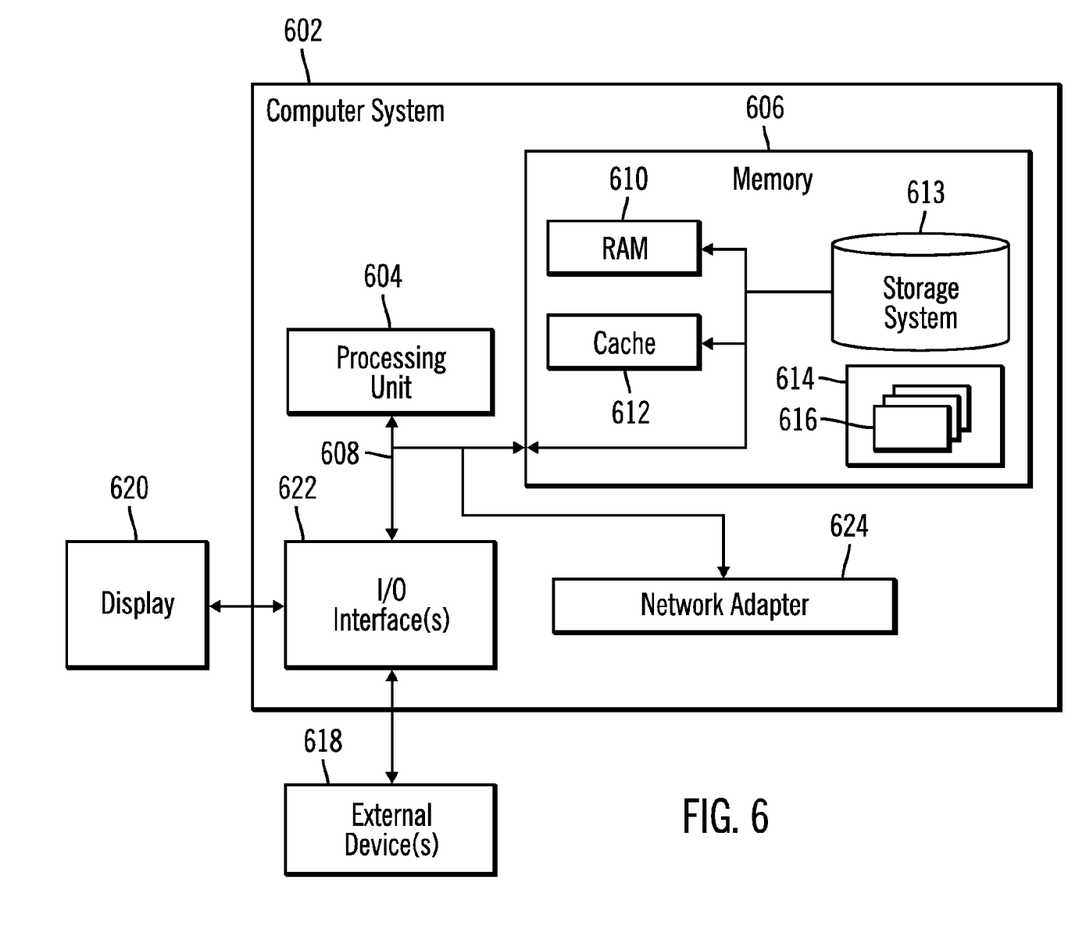
FIG. 6 illustrates an embodiment of a computer architecture used with described embodiments.

The computational components of FIG. 1, including the servers 100a, 100b, 100c and management consoles 124a, 124n, 124c may be implemented in one or more computer systems, such as the computer system 602 shown in FIG. 6. Computer system/server 602 may be described in the general context of computer system executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system/server 602 is shown in the form of a general-purpose computing device. The components of computer system/server 602 may include, but are not limited to, one or more processors or processing units 604, a system memory 606, and a bus 608 that couples various system components including system memory 606 to processor 604. Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 613 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 608 by one or more data media interfaces. As will be further depicted and described below, memory 606 may include at least one program product having a set (e.g., at least one) of program modules that are configured to carry out the functions of embodiments of the invention.

Program/utility 614, having a set (at least one) of program modules 616, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. The components of the computer 602 may be implemented as program modules 616 which generally carry out the functions and/or methodologies of embodiments of the invention as described herein. The systems of FIG. 1 may be implemented in one or more computer systems 602, where if they are implemented in multiple computer systems 602, then the computer systems may communicate over a network.

Computer system/server 602 may also communicate with one or more external devices 618 such as a keyboard, a pointing device, a display 620, etc.; one or more devices that enable a user to interact with computer system/server 602; and/or any devices (e.g., network card, modem, etc.) that enable computer system/server 602 to communicate with one or more other computing devices. Such communication can occur via Input/Output (I/O) interfaces 622. Still yet, computer system/server 602 can communicate with one or more networks such as a local area network (LAN), a general wide area network (WAN), and/or a public network (e.g., the Internet) via network adapter 624. As depicted, network adapter 624 communicates with the other components of computer system/server 602 via bus 608. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for monitoring health status of components in a mirror copy storage environment mirroring data between a first storage, managed by a first server, and a second storage, managed by a second server, over a mirroring network, wherein a management console is connected to the first server over a console network, the computer program product comprising a computer readable storage medium having computer readable program code embodied therein that is executable to perform operations, the operations comprising:
    determining that the management console is unavailable over the console network;
    determining a health status at the first server and the first storage in response to determining that the management console cannot be reached over the console network, wherein the health status indicates whether there are errors or no errors at the first server and the first storage;
    determining, by the first server, available paths through the mirroring network to the second server and at least one additional server, wherein data is mirrored among the first storage, the second storage and at least one additional storage through the available paths in the mirroring network;
    selecting, by the first server, one of the second server and the at least one additional server accessible over the determined available paths;
    transmitting, by the first server, the determined health status to the second server over the mirroring network in response to selecting the second server, wherein the determined health status is forwarded to an administrator; and
    transmitting the health status to the selected at least one additional server in response to selecting one of the at least one additional server accessible over the determined available paths.

2. The computer program product of claim 1, wherein the management console comprises a first management console and the console network comprises a first console network, wherein a second management console is connected to the second server over a second console network, wherein the operations further comprise:
    transmitting, by the second server, the determined health status over the second console network to the second management console to provide to the administrator.

3. The computer program product of claim 1, wherein the operations further comprise:
    transmitting, by at least one of the first server and the second server, the determined health status over a third channel independent of the mirroring and console networks to a remote system to provide to the administrator.

4. The computer program product of claim 1, wherein the determining that the management console cannot be reached over the console network comprises:
    periodically, sending, by the first server, a heartbeat signal to the management console over the console network, wherein the determining that the management console is unavailable is made in response to not receiving a response from the management console over the console network to the heartbeat signal within a predetermined time period.

5. The computer program product of claim 1, wherein the transmitting the health status to the second server, comprises:
    broadcasting, over the mirroring network, the determined health status to at least one additional server, involved in mirroring data over the mirroring network, to provide the determined health status to an administrator using the at least on additional server, wherein the at least one additional server transmits the determined health status over an additional console network to an additional management console.

6. The computer program product of claim 1, wherein the determining the health status comprises:
    determining whether there is an error at the first server and the first storage;
    in response to determining that there is an error in the first storage, determining at least one volume affected by the error and at least one storage device in the first storage having the error; and
    indicating in the health status the determined error in at least the first server and the second storage, that the management console is unavailable, and any determined of the at least one volume and the at least one storage device in the first storage having the error.

7. The computer program product of claim 1, wherein the mirroring network is only used for mirroring data between the first server and the second server while the management console is available over the console network, and wherein the console network is only used for communication between the first server and the management console while the management console is available.

8. The computer program product of claim 1, wherein the mirroring network connects the first server to the second server through a first and second ports on the first and second servers, respectively, and wherein the console network connects the management console to the first server through a third and fourth ports there on the first server and the management console, respectively.

9. The computer program product of claim 1, wherein data is mirrored from at least one of the first storage to the second storage and the second storage to the first storage.

10. A system for monitoring health status of components in a mirror copy storage environment, comprising
    a first server managing access to a first storage;
    a second server managing access to a second storage;
    a mirroring network over which data is mirrored between the first storage and the second server;
    a management console;
    a console network connecting the management console to the first server;
    wherein the first server includes a computer readable storage medium having computer readable program code embodied therein that is executable to perform operations, the operations comprising:
        determining that the management console is unavailable over the console network;

determining a health status at the first server and the first storage in response to determining that the management console cannot be reached over the console network, wherein the health status indicates whether there are errors or no errors at the first server and the first storage;

determining available paths through the mirroring network to the second server and at least one additional server, wherein data is mirrored among the first storage, the second storage and at least one additional storage through the available paths in the mirroring network;

selecting one of the second server and the at least one additional server accessible over the determined available paths;

transmitting the determined health status to the second server over the mirroring network in response to selecting the second server, wherein the determined health status is forwarded to an administrator; and transmitting the health status to the selected at least one additional server in response to selecting one of the at least one additional server accessible over the determined available paths.

11. The system of claim 10, wherein the management console comprises a first management console and the console network comprises a first console network, wherein a second management console is connected to the second server over a second console network, wherein the operations further comprise:

transmitting, by the second server, the determined health status over the second console network to the second management console to provide to the administrator.

12. The system of claim 10, wherein the determining that the management console cannot be reached over the console network comprises:

periodically, sending, by the first server, a heartbeat signal to the management console over the console network, wherein the determining that the management console is unavailable is made in response to not receiving a response from the management console over the console network to the heartbeat signal within a predetermined time period.

13. The system of claim 10, wherein the transmitting the health status to the second server, comprises:

broadcasting, over the mirroring network, the determined health status to at least one additional server, involved in mirroring data over the mirroring network, to provide the determined health status to an administrator using the at least on additional server, wherein the at least one additional server transmits the determined health status over an additional console network to an additional management console.

14. The system of claim 10, wherein the determining the health status comprises:

determining whether there is an error at the first server and the first storage;

in response to determining that there is an error in the first storage, determining at least one volume affected by the error and at least one storage device in the first storage having the error; and indicating in the health status the determined error in at least the first server and the second storage, that the management console is unavailable, and any determined of the at least one volume and the at least one storage device in the first storage having the error.

15. The system of claim 10, wherein the mirroring network is only used for mirroring data between the first server and the second server while the management console is available over the console network, and wherein the console network is only used for communication between the first server and the management console while the management console is available.

16. A method for monitoring health status of components in a mirror copy storage environment mirroring data between a first storage, managed by a first server, and a second storage, managed by a second server, over a mirroring network, comprising:

determining that a management console is unavailable over a console network;

determining a health status at the first server and the first storage in response to determining that the management console cannot be reached over the console network, wherein the health status indicates whether there are errors or no errors at the first server and the first storage;

determining, by the first server, available paths through the mirroring network to the second server and at least one additional server, wherein data is mirrored among the first storage, the second storage and at least one additional storage through the available paths in the mirroring network;

selecting, by the first server, one of the second server and the at least one additional server accessible over the determined available paths;

transmitting, by the first server, the determined health status to the second server over the mirroring network in response to selecting the second server, wherein the determined health status is forwarded to an administrator; and transmitting the health status to the selected at least one additional server in response to selecting one of the at least one additional server accessible over the determined available paths.

17. The method of claim 16, wherein the management console comprises a first management console and the console network comprises a first console network, wherein a second management console is connected to the second server over a second console network, further comprising:

transmitting, by the second server, the determined health status over the second console network to the second management console to provide to the administrator.

18. The method of claim 16, wherein the determining that the management console cannot be reached over the console network comprises:

periodically, sending, by the first server, a heartbeat signal to the management console over the console network, wherein the determining that the management console is unavailable is made in response to not receiving a response from the management console over the console network to the heartbeat signal within a predetermined time period.

19. The method of claim 16, wherein the transmitting the health status to the second server, comprises:

broadcasting, over the mirroring network, the determined health status to at least one additional server, involved in mirroring data over the mirroring network, to provide the determined health status to an administrator using the at least on additional server, wherein the at least one additional server transmits the determined health status over an additional console network to an additional management console.

20. The method of claim 16, wherein the determining the health status comprises:

determining whether there is an error at the first server and the first storage;

in response to determining that there is an error in the first storage, determining at least one volume affected by the error and at least one storage device in the first storage having the error; and indicating in the health status the determined error in at least the first server and the second storage, that the management console is unavailable, and any determined of the at least one volume and the at least one storage device in the first storage having the error.

21. The method of claim 16, wherein the mirroring network is only used for mirroring data between the first server and the second server while the management console is available over the console network, and wherein the console network is only used for communication between the first server and the management console while the management console is available.

* * * * *